May 11, 1943. C. F. EATON 2,318,842
OUTFIT FOR SHIPPING LIQUID AND DIPPING ARTICLES THEREIN
Filed March 8, 1941
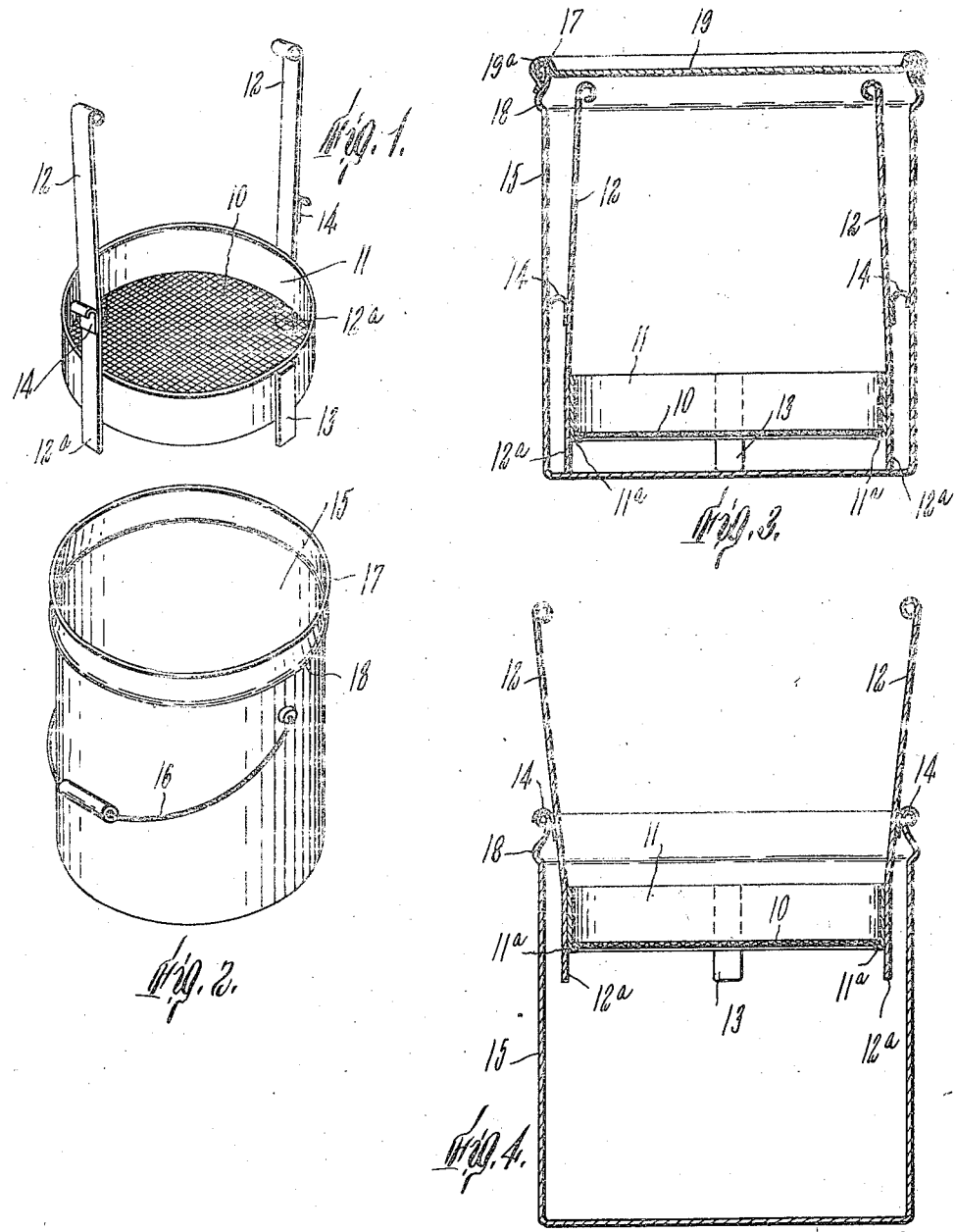
Inventor
Charles F. Eaton
by Nathaniel P. Wharton
Atty.

Patented May 11, 1943

2,318,842

UNITED STATES PATENT OFFICE 2,318,842

OUTFIT FOR SHIPPING LIQUID AND DIPPING ARTICLES THEREIN

Charles F. Eaton, Methuen, Mass., assignor to Bennett Incorporated, Cambridge, Mass., a corporation of Massachusetts Application March 8, 1941, Serial No. 382,406

1 Claim. (Cl. 220—17)

This invention relates to an outfit for shipping or holding liquid and dipping articles therein. The outfit of the present invention comprises more particularly a pail that is to serve the dual function of a shipping and dipping pail and that is equipped with a dipping basket for carrying out the dipping function. Such a pail is of advantage when, as sold to the consumer full of dipping liquid, it comes equipped with a dipping basket fitted therein and readily accessible and operable in combination with the pail.

While not limited thereto, the outfit or assembly of the present invention is particularly serviceable in connection with a degreasing liquid such as is useful as a dipping medium for the cleansing or degreasing of fouled automotive engine parts. In such case, the user of the liquid should properly be provided with a dipping basket for dipping and/or extracting the parts in the liquid. The outfit of the present invention contains such a basket and more especially one normally at rest on the pail bottom and occupying comparatively little of the liquid-holding space of the pail. The basket bottom is foraminous so as to permit the desired drainage; and it is surrounded by a curb or rim from which project upwardly on opposite sides a pair of handles each reaching practically to the level of the pouring lip of the pail and hence readily accessible, even when the pail is practically full, for raising or partial withdrawal of the basket for dipping use. The handles, which are preferably made of suitable springy metal, are so tensioned as to tend to spring apart somewhat as they are being pulled out of the pail; and near its lower end portion, each handle has a hook element which, as the basket is being raised or withdrawn, may be readily sprung out into engagement over the lip of the pail so as to support the basket in the desired dipping position in the liquid contents of the pail. After the desired period of dipping treatment, the basket holding the degreased parts may be raised to a draining position so that the drained and degreased parts may be removed therefrom.

With the foregoing and other features and objects in view, the present invention will now be described in further detail with particular reference to the accompanying drawing wherein, Fig. 1 depicts in perspective a dipping basket such as enters into the assembly of the present invention.

Fig. 2 similarly illustrates a pail for such purpose.

Fig. 3 is a vertical section through the assembly or outfit hereof as it is shipped to the consumer.

Fig. 4 is a similar view through the assembly with the basket raised to a dipping position.

As appears best in Fig. 1, the basket member comprises a foraminous bottom 10, which may consist of wire cloth, perforated plate metal or the like, surrounded by a curb or rim 11, which may be formed or developed from a band of suitable sheet metal, such as galvanized sheet steel or its equivalent. The lower marginal portion of the curb 11 may be inturned, as shown in Figs. 3 and 4, to form an annular flange 11a, on which the bottom 10 may be carried and to which the bottom may be suitably secured, as by soldering. Projecting upwardly from the curb 11 on opposite sides thereof and suitably secured thereto, as by soldering, are a pair of handles 12, each of which is preferably continued somewhat beyond the lower edge of the curb so as to afford a leg portion 12a for resting on the bottom of the pail. If desired, a pair of supplemental leg members 13 may be secured to the curb 11 at 90° intervals from (i. e., in symmetrical relation to) the leg portions 12a. Each handle 12, which preferably consists of a flat bar of galvanized steel or its equivalent, is provided on its outer face with a rigid catch element 14 preferably in the form of a hook, fixed thereto, as by soldering, at a position preferably somewhat above the upper edge of the curb 11.

The size of the basket of Fig. 1 is such that it fits snugly within the pail or bucket 15 of Fig. 2, which, as illustrated, may be formed up from sheet metal and have the usual wire handle 16 pivotally attached to its side walls. Indeed, the fit of the basket within the pail is preferably such that the outer extremities of the hook elements 14 bear against or engage frictionally the internal side walls of the pail which are substantially vertical, as can be seen from Fig. 3. With the basket thus fitted snugly within the pail and pushed downwardly thereinto so that the lower ends of the leg portions 12a and the legs 13 rest on the pail bottom, the pail is practically filled for shipment with the dipping liquid, for instance, to a level just below the lip 17 of the pail, which level may be defined by an outward bulge or recess 18 in its wall against which the marginal portion 19a of a suitable cover or closure 19 is to be clinched. It is to be observed that, in the assembly as thus made for shipment, the upper end portions of the handles 12 are slightly above or at the level of the liquid contents of the pail and are thus readily accessible, when the cover 19 is removed, for raising or partial withdrawal of the basket to a dipping position in the liquid contents.

When outside of, or disassembled from, the pail 15, the handles 12 diverge slightly, as shown in Fig. 1. When, however, the basket is positioned inside the pail, as illustrated in Fig. 3, the handles 12 are tensioned or flexed so as to converge slightly toward each other. The steel or equivalent material of which the handles are constructed is sufficiently resilient or springy so that, as the basket is being raised or withdrawn from the pail and the tension thereon is released, the handles spring back or recover their original sprung-apart or slightly diverging relationship. The withdrawal or raising of the basket by the handles 12 is continued until their hook elements 14 spring out into engagement over the lip 17 of the pail so as to hold the basket in the desired dipping position on the pail. The automotive parts to be degreased may be placed on the foraminous bottom or support 10 of the basket and the basket may be kept immersed in the liquid for the desired degreasing treatment. After the desired length of dipping treatment, the basket may be raised above the liquid level and the liquid therefrom; and the drained and degreased parts may then be removed therefrom.

Once the operator is finished with his work, the dipping basket may be resubmerged to its lowermost or normal position inside the pail, as shown in Fig. 3, and the pail closed by the cover 19 and stored away until desired for another dipping treatment.

An embodiment of this invention having been described, it should be clear that such embodiment is susceptible of change or modification while still embracing the inventive principles hereof as defined by the appended claim.

I claim:

A cylindrical shipping and dipping container for holding a dipping liquid having a circular dipping basket of appreciably less diameter therein for carrying out the dipping of articles in the liquid in the container, said basket having its wall formed of sheet metal band and having opposed upwardly projecting handles of metal strip rigidly secured in face contact with said band for raising or partial withdrawal of the basket for dipping use, said container having a cover and said basket and its handles being entirely enclosed in the covered container, said handles cooperating with said band to resiliently hold them normally in divergent position so as to spring apart as they are pulled out of the container, and hook elements connected to the handles at a point intermediate their length and snugly engaging the internal wall of the closed container because of the resilient divergence of said handles, said handles when the cover is removed from the container being adapted to be gripped by the user and drawn toward each other whereby the snug engagement of the hook elements with the container wall is discontinued and the basket may be freely moved up and down within the dipping liquid and the basket may be withdrawn to a position where the resiliently divergent handles will allow the hook elements to firmly engage the rim of the mouth of the container to support the basket in a position to receive articles and permit dipped articles to drain.

CHARLES F. EATON.